(12) United States Patent
Rajauria et al.

(10) Patent No.: US 12,159,653 B1
(45) Date of Patent: Dec. 3, 2024

(54) DATA STORAGE DEVICE WITH LASER WRITE BIAS OPTIMIZATION USING DISK THERMAL-MAGNETIC RESPONSE MAPPING IN HEAT-ASSISTED MAGNETIC RECORDING

(71) Applicant: WESTERN DIGITAL TECHNOLOGIES, INC., San Jose, CA (US)

(72) Inventors: Sukumar Rajauria, San Jose, CA (US); Pierre-Olivier Jubert, San Jose, CA (US); Phillip S. Haralson, Huntington Beach, CA (US); Jimmy Zhang, Irvine, CA (US); Farzad Novin, Laguna Niguel, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,458

(22) Filed: Aug. 10, 2023

Related U.S. Application Data

(60) Provisional application No. 63/523,771, filed on Jun. 28, 2023.

(51) Int. Cl.
  *G11B 11/105* (2006.01)
  *G11B 5/03* (2006.01)
  (Continued)

(52) U.S. Cl.
  CPC ........ *G11B 5/03* (2013.01); *G11B 2005/0021* (2013.01)

(58) Field of Classification Search
  CPC ..... G11B 21/106; G11B 5/012; G11B 20/182; G11B 5/02; G11B 5/40; G11B 20/10351;
  (Continued)

(56) References Cited

U.S. PATENT DOCUMENTS 8,929,186 B1    1/2015  Sharma et al.
9,240,205 B1    1/2016  Gao et al.
(Continued)

FOREIGN PATENT DOCUMENTS

JP    2016194967 A    11/2016
WO    WO2016187379 A1    11/2016

OTHER PUBLICATIONS

S. Xiong et al., "Spacing Control in Heat Assisted Magnetic Recording", in IEEE Magnetics TMRC 2018, Aug. 2018, 6 pages. http://tmrc2018.ucsd.edu/Archive/Digest.pdf.
(Continued)

*Primary Examiner* — Nabil Z Hindi
(74) *Attorney, Agent, or Firm* — Calderon Safran & Wright P.C.

(57) ABSTRACT

Various illustrative aspects are directed to a data storage device, comprising one or more disks; an actuator mechanism configured to position a selected head among one or more heads proximate to a corresponding disk surface among the one or more disks, wherein the selected head comprises a magnetic write element and a laser generating component; and one or more processing devices. The one or more processing devices are configured to measure a magnetic saturation responsiveness of the corresponding disk surface to heat-assisted write operations using a range of values of write laser current applied to the laser generating component. The one or more processing devices are further configured to calibrate a nominal write laser current of the selected head for the corresponding disk surface based on the measured magnetic saturation responsiveness of the corresponding disk surface.

20 Claims, 5 Drawing Sheets

(51) Int. Cl.
 *G11B 5/54* (2006.01)
 *G11B 5/00* (2006.01)

(58) Field of Classification Search
 CPC ... G11B 2005/0013; G11B 20/18; G11B 5/00;
  G11B 2005/0018; G11B 13/08; G11B
  11/1051; G11B 11/105; G11B 5/6088;
  G11B 11/10511; G11B 7/1263; G11B
  7/1267; G11B 2005/0021
 USPC .................................................. 360/59, 75
 See application file for complete search history.

(56) References Cited

U.S. PATENT DOCUMENTS

| | | |
|---|---|---|
| 9,355,671 B2 | 5/2016 | Rausch et al. |
| 9,478,248 B2 | 10/2016 | Cordle et al. |
| 9,595,288 B1 | 3/2017 | Chu et al. |
| 9,620,162 B1 | 4/2017 | Haralson |
| 9,741,363 B2 | 8/2017 | Ma et al. |
| 9,842,619 B1 * | 12/2017 | Chu ................. G11B 20/1816 |
| 10,381,036 B1 | 8/2019 | Lammers et al. |
| 10,446,182 B1 | 10/2019 | Zhang et al. |
| 11,276,432 B1 | 3/2022 | Jubert et al. |
| 11,423,939 B1 | 8/2022 | Jubert et al. |
| 2016/0055881 A1 | 2/2016 | Cordle et al. |
| 2017/0092318 A1 | 3/2017 | Chu et al. |
| 2022/0343943 A1 | 10/2022 | Poss et al. |

OTHER PUBLICATIONS

P. Jubert et al., "Spin-stand Measurements to Extract the Switching Distributions of Heat-Assisted Magnetic-Recording Media," in IEEE Transactions on Magnetics, 2022, 6 pages. doi: 10.1109/TMAG. 2022.3214085.

T. Rausch et al., "HAMR Drive Performance and Integration Challenges," in IEEE Transactions on Magnetics, vol. 49, No. 2, Feb. 2013, pp. 730-733. https://doi: 10.1109/TMAG.2012.2218228.

T. Trinh et all., "Dependence of optical laser power on disk radius, head-disk spacing and media properties in heat-assisted magnetic recording" in Microsystem Technologies, 6 pages. published online May 20, 2020. https://doi.org/10.1007/s00542-020-04881-y.

* cited by examiner

DATA STORAGE DEVICE WITH LASER WRITE BIAS OPTIMIZATION USING DISK THERMAL-MAGNETIC RESPONSE MAPPING IN HEAT-ASSISTED MAGNETIC RECORDING

BACKGROUND

Data storage devices such as disk drives comprise a disk and a read/write head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 6$_1$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 6$_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide novel and inventive circuitry, systems, devices, methods, and techniques for intelligently tuning and optimizing laser write current applied to laser diodes in a heat-assisted magnetic recording (HAMR) disk drive. Disk drive control circuitry of this disclosure may measure magnetic responsiveness of the disk surface media to a write assistance laser emitted from a read/write head at different values of applied laser current during write operations, and determine and optimize a write laser current that achieves a selected magnetic saturation threshold of orienting the magnetic grains in the disk surface, among other inventive advantages in accordance with aspects of the present disclosure.

A disk drive of this disclosure may determine the selected saturation threshold for each head based on multiple factors to ensure nominal write strength and to optimize for data density consistent with nominal write strength, among other inventive advantages. A disk drive of this disclosure may also map the laser responsiveness of each media disk surface to its corresponding head across the disk surface and generate a map of custom fine-tuning of the laser current across the disk surface to meet the selected saturation threshold in each data sector or other portion of the disk surface, to finely calibrate the laser current to adhere to the selected saturation threshold in compensation for variations across the disk surface. A disk drive of this disclosure may also iteratively re-measure the laser responsiveness of each head-media set and re-map the write laser for each head across its corresponding disk surface over time, to maintain writing at the selected saturation threshold with precision as any conditions in the laser diode, the head, and the media surface may vary over time. By applying techniques such as these and as further disclosed herein, disk drives of this disclosure may provide more consistently reliable, precise, and high density data storage than is possible in conventional HAMR disk drives.

Conventional HAMR disk drives are prone to issues with inconsistent and low write quality, especially in any change of conditions in the head or disk surface media. Among the inventive insights of this disclosure, conventional HAMR disk drives have their laser currents set at levels that do not result in saturation of orientation of the magnetic grains, sometimes resulting in lower than nominal write strength signal-to-noise ratio (SNR) and higher than nominal squeeze error rate (SER). Conventional HAMR disk drive laser currents levels are also prone to departures from ideal laser power, both short-term such as due to laser mode hops, and long-term drift in laser responsiveness over time, thus causing the write strength to modify over time. The laser diodes may evolve in their responsiveness over time such that the laser power emitted in response to a given write current applied to the laser diode for writing modifies over time. Such drift in laser responsiveness over time thus causes the write strength to modify over time. Both laser mode hops and long-term drift in laser diode responsiveness modify the laser output power in the direction of weaker and more unreliable write strength in most cases. Conventional HAMR disk drives are also prone to anomalous write operations due to imperfections in the media disk surfaces.

Disk drives of this disclosure may resolve such suboptimal and anomalous behaviors of conventional disk drives, and may ensure consistently nominal write operation performance, among other inventive advantages in accordance with aspects of the present disclosure. Disk drives of this disclosure may measure and characterize magnetic responsiveness of the media disk surface and determine a laser current that achieves a selected saturation threshold of orienting magnetic grains in the magnetic medium of the disk surface. Disk drives of this disclosure may statistically characterize and map characteristics of a distribution of media disk surface temperature and/or write magnetic saturation in response to given values of applied write laser current. Disk drives of this disclosure may statistically characterize and map characteristics of the distribution of write magnetic saturation in response to applied write laser current in terms of a reference value of current and a dispersion metric. The reference value may be a mean average value for achieving a one-half magnetic saturation in response to the applied current, and the dispersion metric may be a value of additional current that achieves a standard deviation in further magnetic saturation responsive to the applied current, for example. In various examples, disk drives of this disclosure may thus statistically characterize and map the mean and standard deviation of media disk surface temperature and write magnetic saturation in response to given values of applied write laser current. Disk drives of this disclosure may determine a multiplier factor based on the determined distribution.

Disk drives of this disclosure may generate and store maps of laser current values that result in media disk surface magnetic saturation levels equal to the determined multiplier factor times the standard deviation above the mean. Disk drives of this disclosure may select a multiplier factor in the range of approximately 2.8 to 4.0 in some examples, based on achieving target values for one or more performance metrics such as magnetic saturation proportion, write strength SNR, and maximum squeeze error rate. Among the inventive insights of this disclosure, write strength SNR relative to increasing peak disk surface media temperature during a heat-assisted write operation is characterized by a curve that slopes upward, then curves through an inflection point, and then substantially levels out. The leveling out substantially correlates with an asymptotically thorough magnetic saturation with a margin of write strength SNR that may provide a nominally reliable write strength, even if the conditions of performing the write operation are impacted within a certain range of perturbation, such as by a previously unmapped variation in laser power responsiveness, fly height, or disk surface media imperfection. Disk drives of this disclosure may measure and compensate for variation both in laser power responsiveness and in disk surface media. Disk drives of this disclosure may achieve new levels of performance and reliability in responsively optimizing for maximum area density capability (ADC) and maintaining consistently nominal squeeze error margins.

Various illustrative aspects are directed to a data storage device, comprising one or more disks; an actuator mechanism configured to position a selected head among one or more heads proximate to a corresponding disk surface among the one or more disks, wherein the selected head comprises a magnetic write element and a laser generating component; and one or more processing devices. The one or more processing devices are configured to measure a magnetic saturation responsiveness of the corresponding disk surface to heat-assisted write operations using a range of values of write laser current applied to the laser generating component. The one or more processing devices are further configured to calibrate a nominal write laser current of the selected head for the corresponding disk surface based on the measured magnetic saturation responsiveness of the corresponding disk surface.

Various illustrative aspects are directed to a method comprising measuring a magnetic saturation responsiveness of a corresponding disk surface to heat-assisted write operations using a range of values of write laser current applied to a laser generating component. The method further comprises calibrating a nominal write laser current of the selected head for the corresponding disk surface based on the measured magnetic saturation responsiveness of the corresponding disk surface.

Various illustrative aspects are directed to one or more processing devices comprising means for measuring a magnetic saturation responsiveness of a corresponding disk surface to heat-assisted write operations using a range of values of write laser current applied to a laser generating component. The one or more processing devices further comprise means for calibrating a nominal write laser current of the selected head for the corresponding disk surface based on the measured magnetic saturation responsiveness of the corresponding disk surface.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
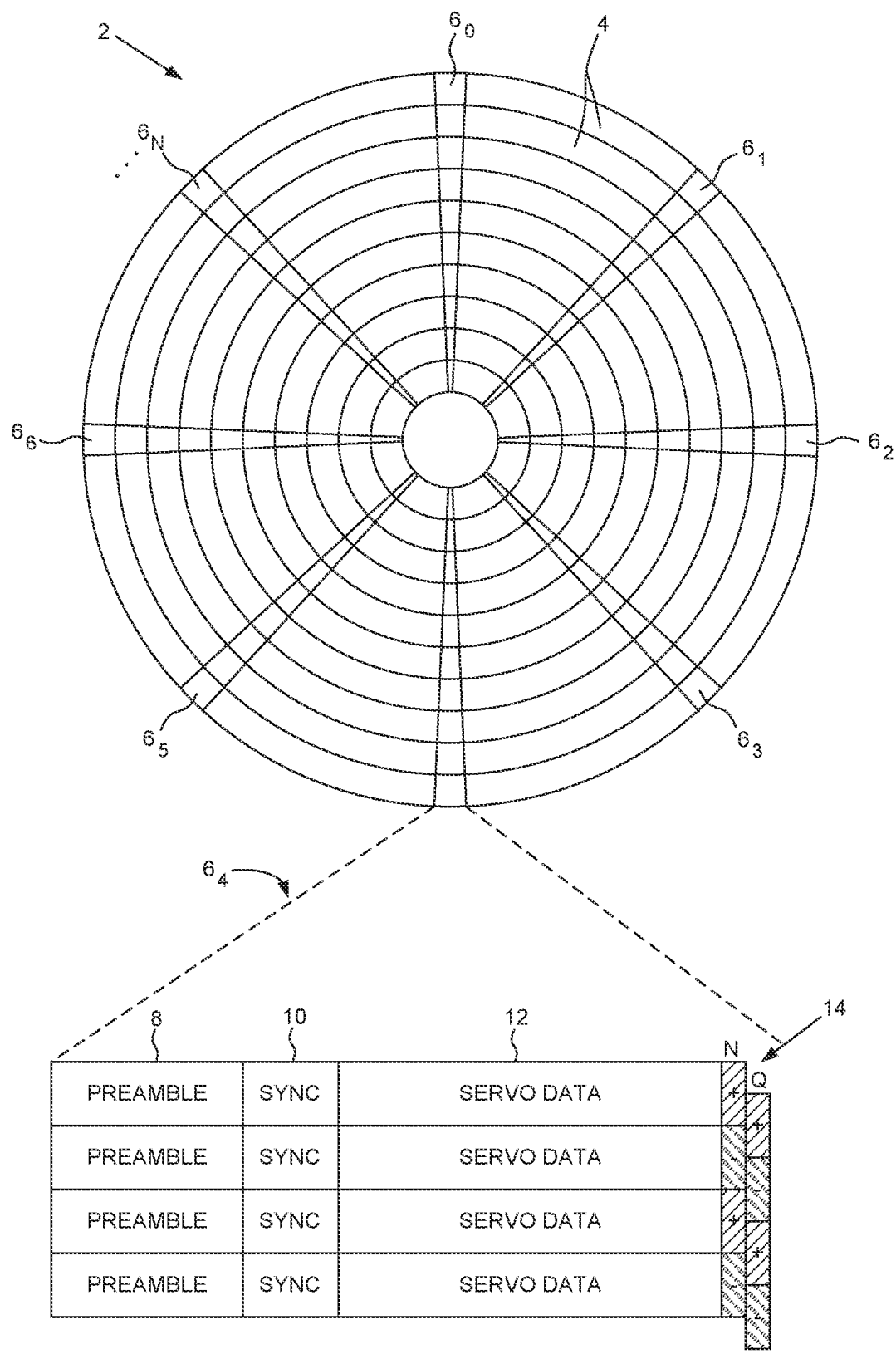
FIG. 1 shows a prior art disk format as comprising a number of radially-spaced, concentric servo tracks defined by servo wedges recorded around the circumference of each servo track.
Figure 2:
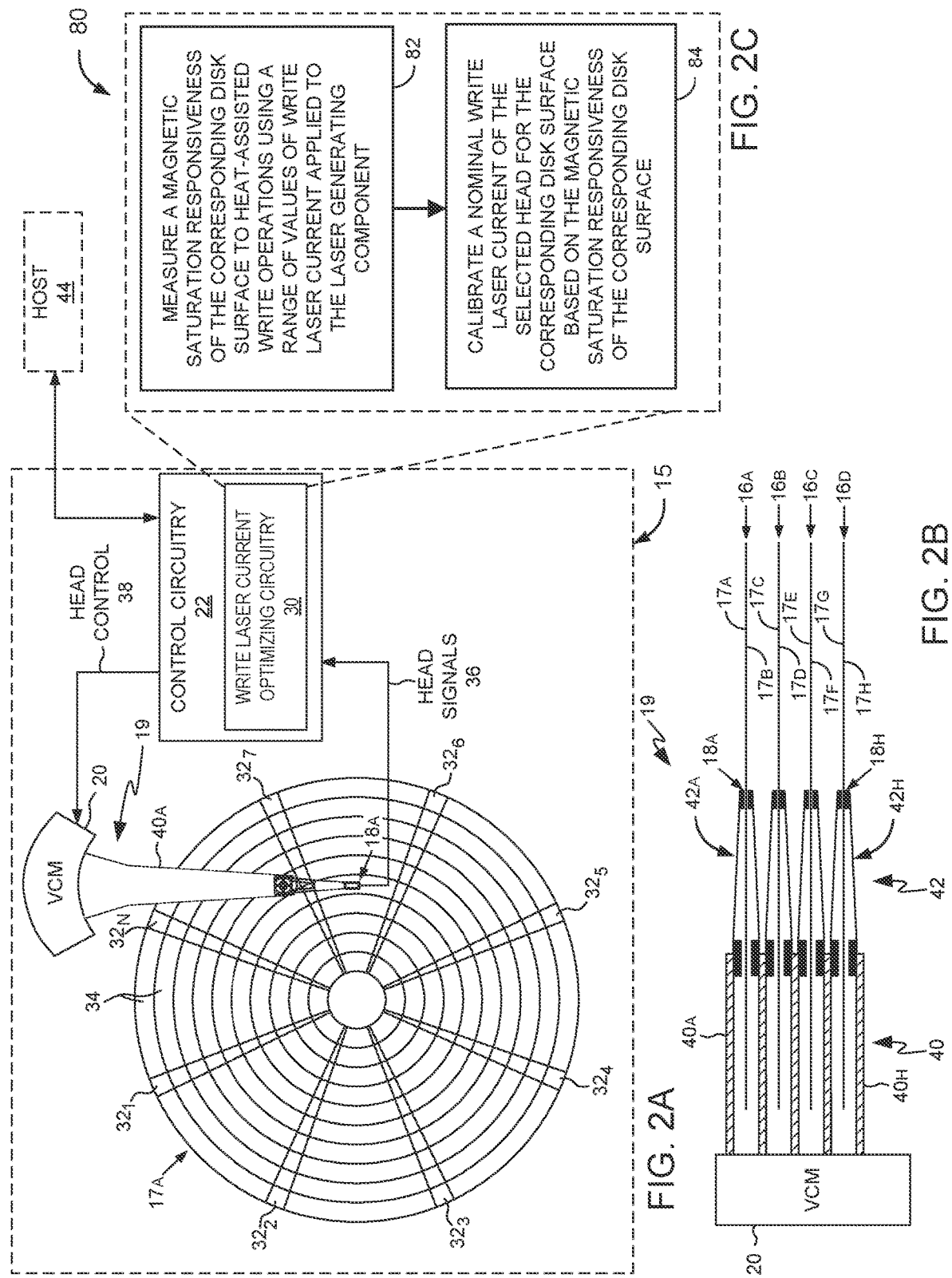
FIGS. 2A and 2B illustrate conceptual block diagrams of a top view and a side view of a data storage device in the form of a disk drive, in accordance with aspects of the present disclosure.
FIG. 2C depicts a flowchart for an example method that read/write channel circuitry of control circuitry of a disk drive may perform or execute in controlling the operations of the disk drive, including for optimizing write laser current, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises write laser current optimization circuitry 30. FIG. 2C depicts a flowchart for an example method 80 that write laser current optimization circuitry 30 of control circuitry 22 may perform or execute in controlling the operations of disk drive 15, in accordance with aspects of the present disclosure, including operations involved in optimizing write laser current for consistently reliable write strength in combination with high area density capability (ADC) in HAMR disk drives, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in a local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head 18 among one or more heads 18, proximate to a corresponding disk surface 17 among the one or more disks 16. Disk drive 15 may be a HAMR disk drive. Selected head 18 may comprise a magnetic write element, and a laser generating component, such as a laser diode, configured together with components enabling a laser emitted by the laser diode to induce write assistance heating of corresponding disk surface 17, as further described below.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, write laser current optimization circuitry 30 of control circuitry 22 may be configured to measure a magnetic saturation responsiveness of the corresponding disk surface to heat-assisted write operations using a range of values of write laser current applied to the laser generating component (82). Write laser current optimization circuitry 30 may further be configured to calibrate a nominal write laser current to apply to the laser diode of selected head 18 for heat-assisted write operations for corresponding disk surface 17 based on the measured magnetic saturation responsiveness of corresponding disk surface 17 (84). Control circuitry 22, including write laser current optimization circuitry 30, may further perform additional actions, methods, and techniques, in accordance with various aspects including as further described herein.

The term "write laser current optimization circuitry 30" as used herein may refer to any hardware, firmware, software, and/or combination thereof, comprised in control circuitry 22 of disk drive 15, which implements, embodies, or engages in any of the structures or functions ascribed herein to write laser current optimization circuitry 30 or to any other of the novel and inventive aspects of the present disclosure. Write laser current optimization circuitry 30 may constitute any hardware, firmware, software, and/or any other elements of control circuitry 22 for optimizing write laser current, and performing other techniques and methods as described herein.

Figure 3:
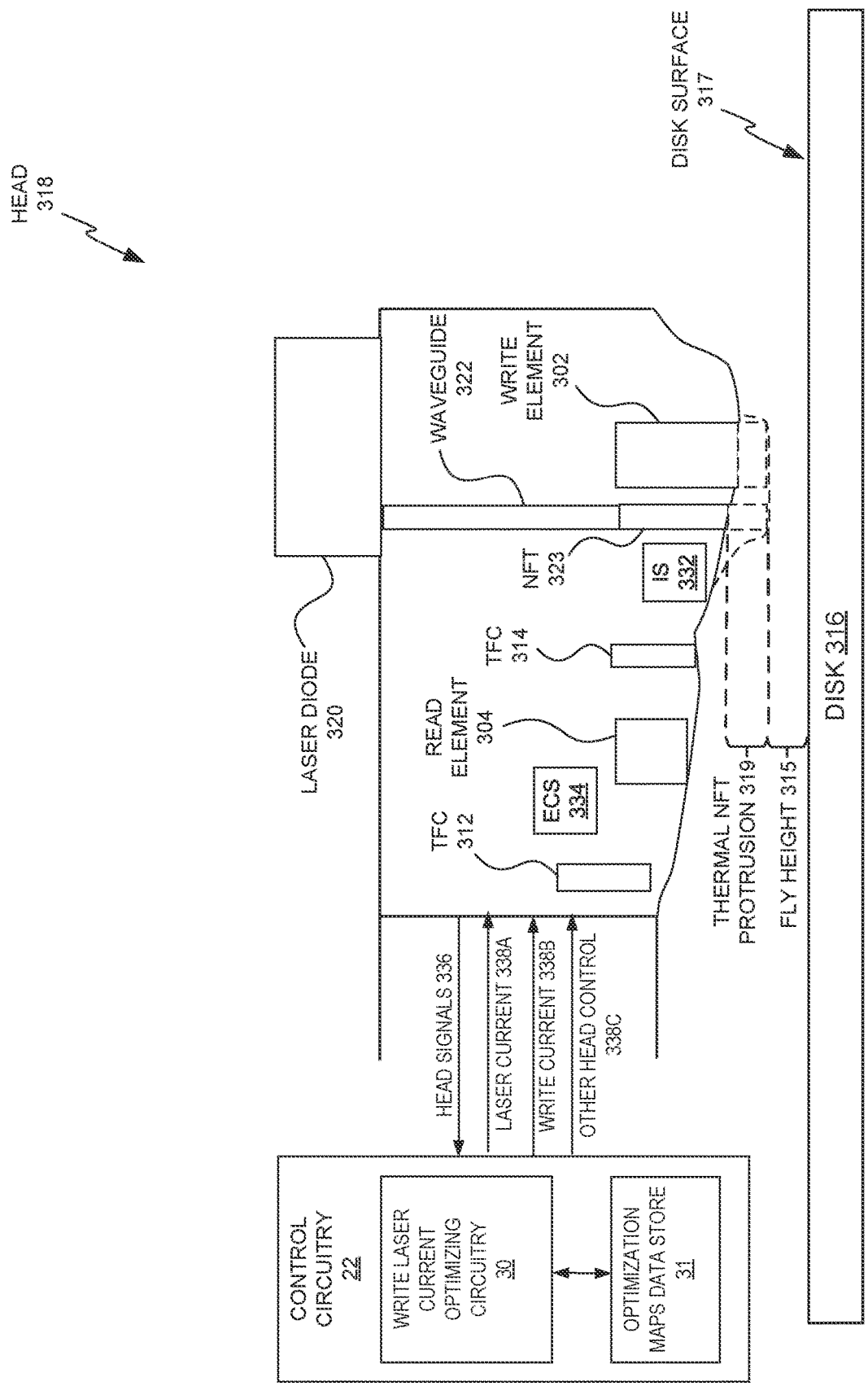
FIG. 3 depicts a conceptual side view diagram of a head of a disk drive, suspended above and operating proximate to a corresponding disk surface, and demonstrating changes in protrusion and aerodynamic profile causing changes in fly height, or head-disk spacing, due to effects such as thermally induced protrusion of the write element and the near-field transducer (NFT), in accordance with various aspects of this disclosure.

FIG. 3 depicts a conceptual side view diagram of a head 318 of a disk drive, suspended above and operating proximate to a corresponding disk surface 317 of disk 316, and demonstrating changes in protrusion and aerodynamic profile causing changes in fly height, or head-disk spacing, due to effects such as thermally induced protrusion of a magnetic write element 302 and a near-field transducer (NFT) 323, in accordance with various aspects of this disclosure. Disk surface 317 and head 318 may be respective implementations of any of disk surfaces 17 and heads 18 as depicted in FIGS. 2A and 2B. FIG. 3 depicts an example thermal NFT protrusion 319 and aerodynamic profile causing changes in fly height 315, or head-disk spacing, due to effects such as NFT pole tip protrusion (NPTP) of NFT 323 due to heating or other energizing by a laser or other energy source, in accordance with various aspects of this disclosure. FIG. 3 is a conceptual diagram and not an engineering schematic, and the elements depicted may be disposed in any of a variety of arrangements in different examples.

Write laser current optimization circuitry 30 may perform determination and mapping of magnetic saturation responsiveness to write laser current across disk surface 317 and optimizing of the write laser current based on that determination and mapping, in various examples. Write laser current optimization circuitry 30 may store maps of magnetic saturation responsiveness and optimized laser write current per media portion in an optimization maps data store 31 also comprised in control circuitry 22. The term "map" as used herein may be such that write laser current optimization circuitry 30 may generate and store a "map" of the magnetic saturation responsiveness to write laser current across disk surface 317 in any form of data structure or set of data in which write laser current optimization circuitry 30 may subsequently look up and access and refer to positions or areas of respective media portions of disk surface 317 and respective properties, such as magnetic saturation responsiveness, of the respective media portions. The example of FIG. 3 is further described as follows with respect to the example depicted in FIG. 3 in which the disk drive is a HAMR drive and the energizing component is implemented as NFT 323.

Control circuitry 22 outputs head control signals 338 to head 318, and receives head signals 336 (including control signals and data) from head 318. Head 318 includes a write element 302, a read element 304, thermal fly height (TFC) control elements 312 and 314, and a laser-generating component laser generating component such as a laser diode 320 configured for emitting a laser via waveguide 322 and NFT 323. The laser induces a plasmon that heats a track on disk surface 317 that passes proximate to write element 302 as head 318 flies over or proximate to disk surface 317.

Control circuitry 22 writes data to disk surface 317 by modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium of disk surface 317, such as, e.g., iron-platinum nanoparticles, by heating disk surface 317 with a laser emitted by laser diode 320 via waveguide 322 and NFT 323 during write operations. Such heating of disk surface 317 decreases the coercivity of the magnetic medium of disk surface 317, thereby enabling the magnetic field generated by the write coil of write element 302 to magnetize the temporarily heated area of disk surface 317. The disk surface encoding the data thus written then cools back down and thereby returns to heightened magnetic coercivity, which durably preserves the written data at higher density than is possible in conventional techniques such as perpendicular magnetic recording (PMR).

Any suitable technique may be employed to heat the surface of the disk in HAMR recording, such as with a laser-generating component such as laser diode 320 and NFT 323 disposed proximate to write element 302 of head 318. Since the quality of the write/read signal depends on the fly height of head 318, and various factors may interact in complex ways to induce changes to the fly height, head 318 may also comprise one or more fly height actuators (FHA) for modifying or controlling the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

A certain increment of laser current may typically have a regular, predictable, linear, or approximately linear in a small operating range, corresponding with a certain increment of power, a certain incremental change in NFT protrusion displacement, and a certain incremental change in fly height spacing (within a practically applicable range), in various examples. Applicable levels of laser current, fly height, and TFC power may be in any of various ranges of values in various examples.

Write laser current optimization circuitry 30 of control circuitry 22 may control the operation of head 318 to perform inventive optimizing of the write laser current. Example details of functions and methods that write laser current optimization circuitry 30 is configured to perform are further described as follows.

Laser current optimization circuitry 30 may be configured to measure a magnetic saturation responsiveness of the corresponding disk surface 317 to heat-assisted write operations using a range of values of write laser current applied to the laser generating component, and to calibrate a nominal write laser current to apply to the laser diode of selected head 318 for heat-assisted write operations for corresponding disk surface 317 based on the measured magnetic saturation responsiveness of corresponding disk surface 317. Laser current optimization circuitry 30 may be configured to perform two or more sweeping test writes and reads of disk surface 317, or at least a portion thereof, with at least two different values of write laser current applied to laser diode 320, and then use the data from the test writes and reads to measure and determine a distribution of the magnetic saturation responsiveness of disk surface 317 relative to different values of applied write laser current. Laser current optimization circuitry 30 may be configured to characterize the distribution of magnetic saturation responsiveness of disk surface 317 relative to different values of applied write laser current in a mapping of distributions of responsiveness of saturation responsiveness relative to write laser current localized to each of a number of portions of disk surface 317, such as per each data sector, or any other subdivision or media portion of disk surface 317, in different examples. Laser current optimization circuitry 30 may be configured to perform two, three, four, five, six, eight, ten, twelve, or any number of sweeping test writes and reads of disk surface 317, or one or more portions thereof, in any number of portions of disk surface 317 in any manner of apportioning the portions, with any number of different values of write laser current applied to laser diode 320, to use the data from the test writes and reads to measure and determine a distribution of the magnetic saturation responsiveness of disk surface 317 relative to different values of applied write laser current, in various examples.

Laser current optimization circuitry 30 may be configured to characterize the distribution of magnetic saturation responsiveness of each of the media portions of disk surface 317 relative to applied write laser current in terms of a reference value of write laser current that achieves 50% or one-half saturation, that is, that re-orients 50% of the magnetic grains in the intended orientation of the write operation, and a dispersion metric that characterizes an additional increment of additional applied write laser current that achieves an additional increment of the dispersion. In a specific example, the incremental re-orientation and saturation degree of the magnetic grains in the media portion may be characterized as a normal distribution, and the dispersion metric may be a standard deviation. In other examples, the dispersion metric may be a variance, or a mean absolute dispersion, or any other statistical dispersion measure. In some examples, the saturation responsiveness relative to the applied write laser current may technically differ from a normal distribution, but may still be approximately a normal distribution, and laser current optimization circuitry 30 may accurately model it as a normal distribution and may accurately characterize and map it in terms of a 50% mean average reference value and standard deviation dispersion metrics.

Disk drives of this disclosure may select a multiplier factor in the range of approximately 2.8 to 4.0 in some examples, based on achieving target values for one or more performance metrics such as magnetic saturation proportion, write strength SNR, and maximum squeeze error rate. Among the inventive insights of this disclosure, write strength SNR relative to increasing peak disk surface media temperature during a heat-assisted write operation is characterized by a curve that slopes upward, then curves through an inflection point, and then substantially levels out, in which the leveling out substantially correlates with an asymptotically thorough magnetic saturation with a margin of write strength SNR that may provide a nominally reliable write strength, even if the conditions of performing the write operation are impacted within a certain range of perturbation, such as by a previously unmapped variation in laser power responsiveness, fly height, or disk surface media imperfection, in various examples.

As noted, write laser current optimization circuitry 30 may analyze the peak disk surface media temperature or peak media temperature. The peak media temperature as discussed herein is a parameter that may characterize the write assistance heating imposed by laser diode 320 via NFT 323 on a given affected media portion of disk surface 317. The peak media temperature may be the peak temperature of the given affected media portion, which write laser current optimization circuitry 30 may detect via temperature sensors on head 318.

Write laser current optimization circuitry 30 may be configured to optimize the write laser current, that is, the current that control circuitry 22 applies to laser diode 320 to induce write assistance heating of disk surface 317 during a write operation. Control circuitry 22 may also apply various values of current to laser diode 320 at other times outside of performing write operations, such as to pre-bias laser diode 320 prior to a write operation; the write laser current may be distinguished from such other currents applied at such other times that are not during a heat-assisted write operation.

Write laser current optimization circuitry 30 may be configured with different values of a multiplier factor, depending on different design and performance criteria. Write laser current optimization circuitry 30 may select a multiplier factor in the range of approximately 3, or approximately in the range of 2.8 to 4.0 in some examples, based on achieving target values for one or more performance metrics such as magnetic saturation proportion, write strength SNR, and maximum squeeze error rate. For example, by selecting a multiplier factor of 3.0, write laser current optimization circuitry 30 performs a mapping sweep of a media disk surface with its corresponding head and statistically characterizes and maps the mean and standard deviation, or sigma, of media disk surface temperature and write magnetic saturation in response to given values of applied write laser current, and sets a map of laser current values that result in media disk surface magnetic saturation levels equal to three times the sigma above the mean. This is equivalent to imposing an approximately 99.7% saturation of the magnetic medium of the disk surface, that is, orienting approximately 99.7% of the magnetic grains in the selected portion of the disk surface in alignment with the intended orientations in each bit area of the track of the intended written data. Write laser current optimization circuitry 30 may also select a sigma multiplier factor in values below 2.8 or above 4.0 in other examples, or other values outside this range in other examples, resulting in magnetic write saturation levels slightly below or higher than 99.7% saturation, respectively.

For example, if write laser current optimization circuitry 30 determines that a particular head-media set has higher than average variation in responsiveness to write operations (which may be due to any of several factors) around the revolution of the disk (still within nominal tolerances), write laser current optimization circuitry 30 may compensate for this higher than average variation by selecting a relatively higher sigma multiplier factor, to compensate for the higher than average variation. A combination of a head and its corresponding media disk surface may be referred to as a head-media set. Write laser current optimization circuitry 30 may select a relatively higher sigma multiplier factor of, for example, 3.2, 3.4, 3.6, 3.8, 4.0, or any other value that may be higher relative to a default sigma multiplier factor in a particular context of disk drive 15. Write laser current optimization circuitry 30 may select a relatively higher sigma multiplier factor based on a criterion that the selected sigma multiplier factor compensates for characterized properties of a subject head-media set to still ensure that write operations achieve at least a selected target saturation proportion. The selected target saturation proportion may be 99.7% as in the example above, or may be another value such as 99.9%, 99.97%, or other values higher or lower than these examples, depending on performance criteria in different examples.

Write laser current optimization circuitry 30 may also map media laser responsiveness and select and implement a sigma multiplier factor of write laser current in different values across different portions of the disk surface. While write laser current optimization circuitry 30 may take various factors into account in performing a high-precision calibration of laser write current to ensure nominal write strength SNR, write laser current optimization circuitry 30 may implement its calibration of laser write current in terms of determining and applying a sigma multiplier factor and setting a write laser current per media disk surface portion such that the current is equal to the determined reference write laser current plus the sigma multiplier factor times the determined standard deviation in media magnetic saturation responsiveness to write laser current. In various examples, write laser current optimization circuitry 30 may also use or implement any of a wide range of other particular techniques and details for measuring and characterizing media magnetic saturation responsiveness to write laser current and for calculating and determining a precision-calibrated write laser current, where those techniques and details may be equivalently expressed in terms of determining and applying a sigma multiplier factor and setting a write laser current per media disk surface portion such that the current is equal to the determined reference write laser current plus the sigma multiplier factor times the determined standard deviation in media magnetic saturation responsiveness to write laser current.

In various examples, write laser current optimization circuitry 30 may select and implement a sigma multiplier factor of write current for each region or for each data sector of a given disk surface, or for any other selected portion of the given disk surface. For example, write laser current optimization circuitry 30 may map a head-media set and determine that the head-media set has an effectively ideal laser saturation responsiveness across much of the media disk surface's area, but also has a couple of zones of the disk surface that have a higher than ideal or higher than average variance in deviations from flatness while still within nominal specifications (e.g., measured in single-digit picometers). In response to detecting this ideal flatness across the majority of the disk surface and the higher than average variances in deviations from flatness of the disk surface in the particular zones, write laser current optimization circuitry 30 may assign a sigma multiplier factor of 3.0 for the ideally flat majority of the disk surface, and a sigma multiplier factor of 4.0 for the zones with higher than average variance in deviations from flatness, in some examples. Write laser current optimization circuitry 30 may define and record individual properties for any media portions of disk surface 317 with any geometries and any level of granularity in which control circuitry 22 is physically capable of reading disk surface 317, in various examples.

In various examples, write laser current optimization circuitry 30 may also customize the sigma multiplier factor for each data sector or other disk surface portion within the zones with higher than average variance in deviations from flatness, depending on and to compensate for the specific variance from ideal flatness in each data sector or other disk surface portion. For example, write laser current optimization circuitry 30 may custom assign a sigma multiplier factor of 3.1 to a first data sector having only a slight deviation outside of an ideal range of flatness, a sigma multiplier factor of 3.9 to a second data sector having only a relatively high though still nominal deviation from the ideal range of flatness, a sigma multiplier factor of 3.5 to a third data sector having an intermediate within nominal deviation from the ideal range of flatness, and so forth. In various examples, write laser current optimization circuitry 30 may map within-nominal deviations in disk surface flatness continuously rather than in discrete sections of area and may customize the sigma multiplier factor continuously rather than discretely. In various cases of customizing a sigma multiplier factor, write laser current optimization circuitry 30 may select and implement custom sigma multiplier factors to adjust write laser current to compensate with high precision for deviations from ideal flatness of the disk surface or for any other kinds of mapped deviations from ideal in the heat-assisted write responsiveness of the head-media set per write laser current applied to the head.

In some applications and use case performance criteria, such as where data is stored redundantly or there are other compensatory data storage mechanisms, there may be capacity and performance justifications to operate with relatively some margin in write strength SNR. For example, different applications may strike different balance points in prioritizing data area density capability relative to write strength SNR, and may include any of various compensatory mechanisms for imperfect write strength SNR such as high-precision read capability, refresh write capability when needed, and/or redundant data storage. In examples such as these, write laser current optimization circuitry 30 may select a sigma multiplier factor in a relatively lower value of a preferred range of values, such as 2.9, 2.8, 2.5, or 2.0, for example, or any other values suitable for a given use case within a total system of this disclosure, in other examples. Sigma multiplier factors below three may result in media magnetic saturation levels below 99.7%, such as 99.6%, 99.5%, or 99%, in various examples, or any other values suitable for a given use case within a total system of this disclosure, in other examples. In these examples also, write laser current optimization circuitry 30 may custom-tune the sigma multiplier factor differently across different portions of a media disk surface, such as per data sector, or continuously, based on a mapping of the media disk surface that write laser current optimization circuitry 30 performs and stores and in context of all relevant calibration criteria within the given system.

Figure 4:
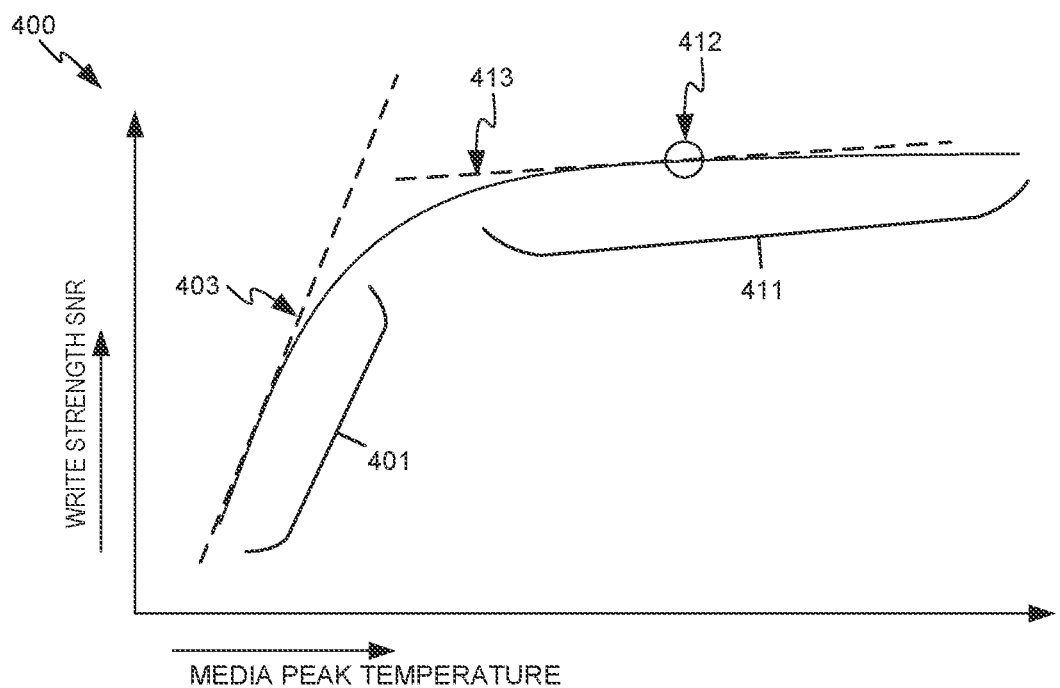
FIG. 4 depicts a graph of determined write strength relative to peak temperature imposed on a particular media portion of a disk surface by a head in a heat-assisted write operation, as write laser current optimization circuitry may determine as a result of a disk surface magnetic responsiveness mapping process, in accordance with aspects of the present disclosure.

FIG. 4 depicts a graph 400 of determined write strength, in terms of write strength SNR, relative to peak temperature imposed on a particular media portion of disk surface 317 by head 318 in a heat-assisted write operation, as write laser current optimization circuitry 30 may determine as a result of a disk surface magnetic responsiveness mapping process, in accordance with aspects of the present disclosure. Write strength SNR (and inverse squeeze error rate) is depicted along the y-axis and media peak temperature is depicted along the x-axis. Specific numbers for both write strength SNR and media peak temperature may vary from one disk surface media portion to another. Media peak temperature ranges applicable may generally be between approximately 600 to 700 kelvins in various iron-platinum media examples. Write laser current optimization circuitry 30 may store the graph of determined write strength relative to peak temperature imposed on the particular disk surface media portion in optimization maps data store 31 as shown in FIG. 3. Write laser current optimization circuitry 30 may collect the data for graph 400 by measuring a magnetic saturation responsiveness of a selected media portion of corresponding disk surface 317 to write operations using a range of values of write laser current applied to the laser generating component, such as laser diode 320, and with the magnetic write current applied to write element 302 held constant at a nominal magnetic write element current. Write laser current optimization circuitry 30 may also equivalently store determined write strength in terms other than SNR, such as in terms of inverse squeeze error rate, in some examples.

Among the inventive insights of this disclosure, conventional HAMR disk drives have typically set uniform write laser currents for heat-assisted write operations that result in peak temperatures within range 401, where write strength SNR is suboptimal, and where applied write laser was typically set uniformly across the disk surface, which may cause resulting write strength SNR to be spread across a range of values at different portions of the disk surface, reflected in the substantially steep slope of representative tangent slope line 403.

In contrast, by write laser current optimization circuitry 30 measuring and analyzing the magnetic saturation responsiveness of a disk surface media portion to write operations using a range of values of write laser current applied to the laser generating component, write laser current optimization circuitry 30 may determine values of write laser current that result in media peak temperature within range 411, at or substantially close to a maximum achievable write strength. Range 411 is also characterized by the slope line 413 of write strength relative to media peak temperature resulting from heat-assisted write operations having substantially leveled out, such that there is little to no additional possible statistically significant write strength SNR to gain from applying higher write laser current and imposing higher peak temperature on the media surface. Range 411 thus defines an operating regime that is past an inflection point in write strength per media peak temperature, in contrast to the conventional operating regime in range 401 below the inflection point. In other words, range 411 defines an operating regime in which magnetic saturation responsiveness of the media portion has achieved substantially thorough magnetic saturation.

In particular examples, write laser current optimization circuitry 30 may calibrate and set a nominal write laser current of selected head 318 for corresponding disk surface 317, or for the given localized media portion of disk surface 317, at a write laser current that imposes the media peak temperature at point 412 along the curve in graph 400. The calibrated nominal write laser current of selected head 318 thus calibrated and defined by write laser current optimization circuitry 30 may be the nominal write laser current that control circuitry 22 thereafter applies to the laser diode in that media portion in subsequent nominal data write operations. Write laser current optimization circuitry 30 may calibrate the nominal write laser current for head 318 for the media portion at the applied write laser current corresponding to media surface peak temperature at point 412 based on the magnetic saturation responsiveness of the corresponding disk surface media portion as shown in graph 400, where point 412 is definitively beyond the inflection point between the high-slope saturation responsiveness regime in range 401 and the settled-slope saturation responsiveness regime in range 411. Point 412 may correspond to a sigma multiplier factor of three sigmas above the mean average value for achieving a one-half magnetic saturation in response to the applied current, in this example.

Figure 5:
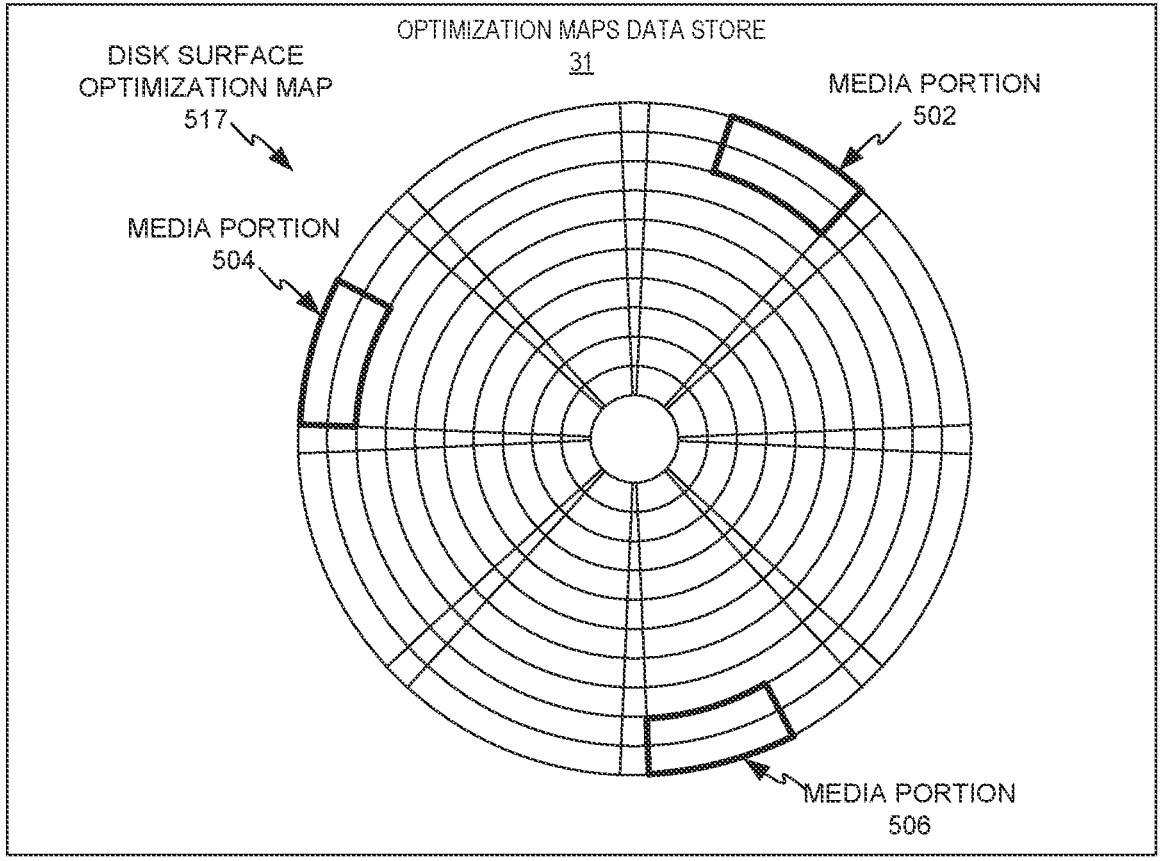
FIG. 5 depicts a conceptual view of a disk surface optimization map that write laser current optimization circuitry may create based on an analytical laser sweep mapping of a disk surface and store in an optimization maps data store, in accordance with aspects of the present disclosure.

FIG. 5 depicts a conceptual view of a disk surface optimization map 517 that write laser current optimization circuitry 30 may create based on an analytical laser sweep mapping of disk surface 317 and store in optimization maps data store 31, in accordance with aspects of the present disclosure. Disk surface optimization map 517 is conceptually depicted in a format of a top plan view of disk surface 317, and illustratively includes depiction of three example disk surface media portions 502, 504, 506, each of which write laser current optimization circuitry 30 may have characterized as having a particular magnetic saturation responsiveness curve that write laser current optimization circuitry 30 has characterized. Write laser current optimization circuitry 30 may calibrate a nominal write laser current for head 318 corresponding with the mapped disk surface 317 based on the individually determined magnetic saturation responsiveness curve of each of disk surface media portions 502, 504, 506. The depicted disk surface media portions 502, 504, 506 are illustrative examples. Write laser current optimization circuitry 30 may map the entirety of disk surface 317 into one, two, ten, 100, 1,000, or any number of different media portions, of any shape, with individually custom-determined magnetic saturation responsiveness curves and individually calibrated nominal write laser current for the respective individual media portion, in various examples. Write laser current optimization circuitry 30 may equivalently map both sides of each of disks 16 in disk drive 15, and calibrate nominal write strengths for each of heads 18 for each individually mapped media portion of each respective disk surface 17, and similarly for however many disks are included in various disk drives of this disclosure with any of different numbers of disks.

Figure 6:
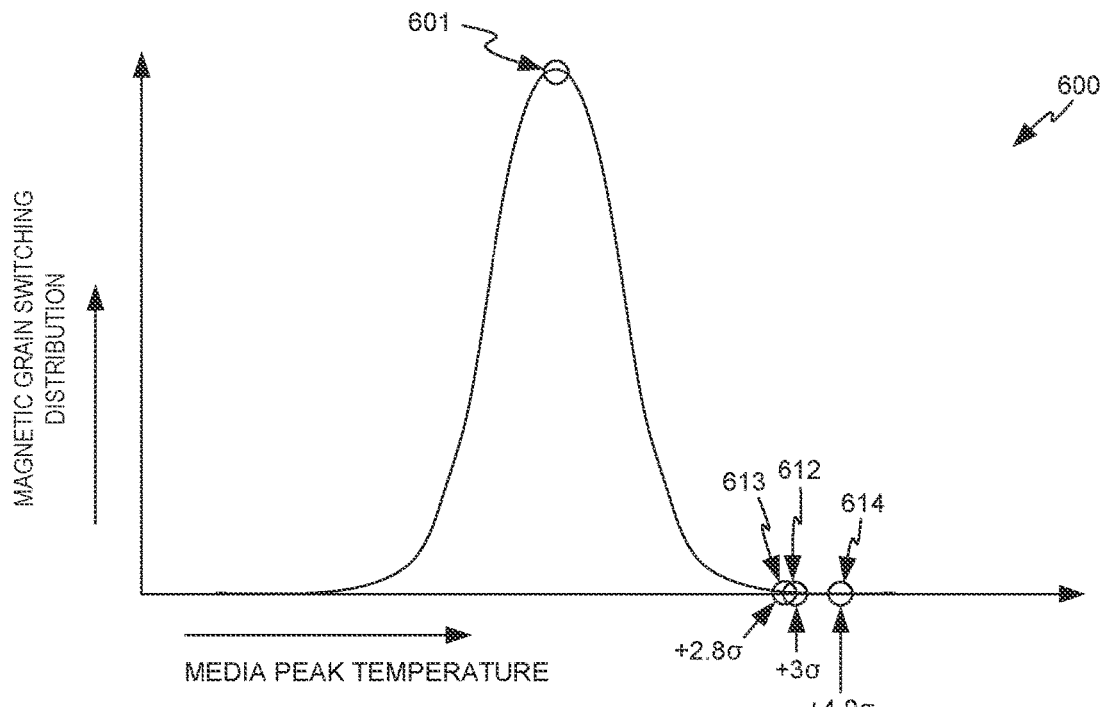
FIG. 6 depicts a graph of a distribution of magnetic grains in a given media portion switching relative to media peak temperature, in accordance with aspects of the present disclosure.

FIG. 6 depicts graph 600 of a distribution of magnetic grains in a given media portion switching (along the y-axis) relative to media peak temperature (along the x-axis), in accordance with aspects of the present disclosure. Write laser current optimization circuitry 30 may accurately characterize the magnetic saturation responsiveness of the disk surface media in a normal distribution, with a mean (shown at 601) and a standard deviation or sigma (with plus and minus one sigma depicted in graph 600). Write laser current optimization circuitry 30 may calibrate and set a nominal write laser current for a head for a given media portion in terms of a write laser current that corresponds to a media peak temperature of the determined mean plus a selected sigma multiplier factor times the determined sigma.

In an example, write laser current optimization circuitry 30 may use a sigma multiplier factor of 3, and may calibrate a nominal write laser current for the given head-media portion set as a write laser current that corresponds to the determined mean media peak temperature plus the selected sigma multiplier factor of 3 times the determined sigma, as shown at 612. In this example, write laser current optimization circuitry 30 may thereby set the calibrated nominal write laser current based on the determined parameters of the magnetic saturation responsiveness of the given head-media portion set such that the applied write laser current results in write operations that achieve a magnetic saturation of 99.7%. Media peak temperature may exhibit a highly reliable relationship with applied write laser current.

Graph 600 also shows another example in which write laser current optimization circuitry 30 may use a sigma multiplier factor of 2.8, shown at 613, which may result in a magnetic saturation of approximately slightly over 99%. In another example, write laser current optimization circuitry 30 may use a sigma multiplier factor of 4.0, shown at 614, which may result in a magnetic saturation of approximately slightly over 99.99%. In other examples of this disclosure, based on a variety of multi-factor optimization regimes, including balancing thoroughness of magnetic saturation against potential high temperature penalties such as area density capability for a selected data density format and laser diode lifetime reliability, write laser current optimization circuitry 30 may use other sigma multiplier factors within or approximate to the range of values depicted in graph 600. The criteria that write laser current optimization circuitry 30 uses to select the sigma multiplier factor may be pre-configured for certain use cases in the process of manufacturing disk drive 15, in various examples. Write laser current optimization circuitry 30 may calibrate some head-media sets toward a relatively lower end of its range for the sigma multiplier factor in cases where a corresponding degree of magnetic saturation yields strong overall area density capability, data density, on-track error rate, and expected laser diode lifetime.

Write laser current optimization circuitry 30 may thus generate maps of magnetic responsiveness to thermal energy of the disk surfaces in a form equivalent to a number of versions of FIG. 5, with a version of FIG. 5 corresponding to each of the disk surfaces, and with the individual magnetic responsiveness to thermal energy of each portion of each of the disk surfaces graphed in the mapping data for each portion of each of the disk surfaces. In a write laser mapping sweep, write laser current optimization circuitry 30 may begin with applying a low level of laser power corresponding to a low temperature as shown on the left part of the x-axis of graph 600 of FIG. 6, and incrementally increasing applied write laser power and thus peak temperature, progressing steadily toward the right along the x-axis in graph 600. The magnetic grains are initialized to one DC polarity, and with magnetic write current also applied, the magnetic grains are subject to thermal agitation by the laser and to the magnetic write current, beginning below the Curie temperature. As the thermal energy applied by write laser current optimization circuitry 30 begins significantly approaching and finally surpassing the Curie temperature, the thermal energy progressively enables reversing of polarity of proportions of magnetic grains under influence of the magnetic write field, which yields a normal distribution of magnetic grain switching toward magnetic saturation over rising media peak temperature.

Figure 7:
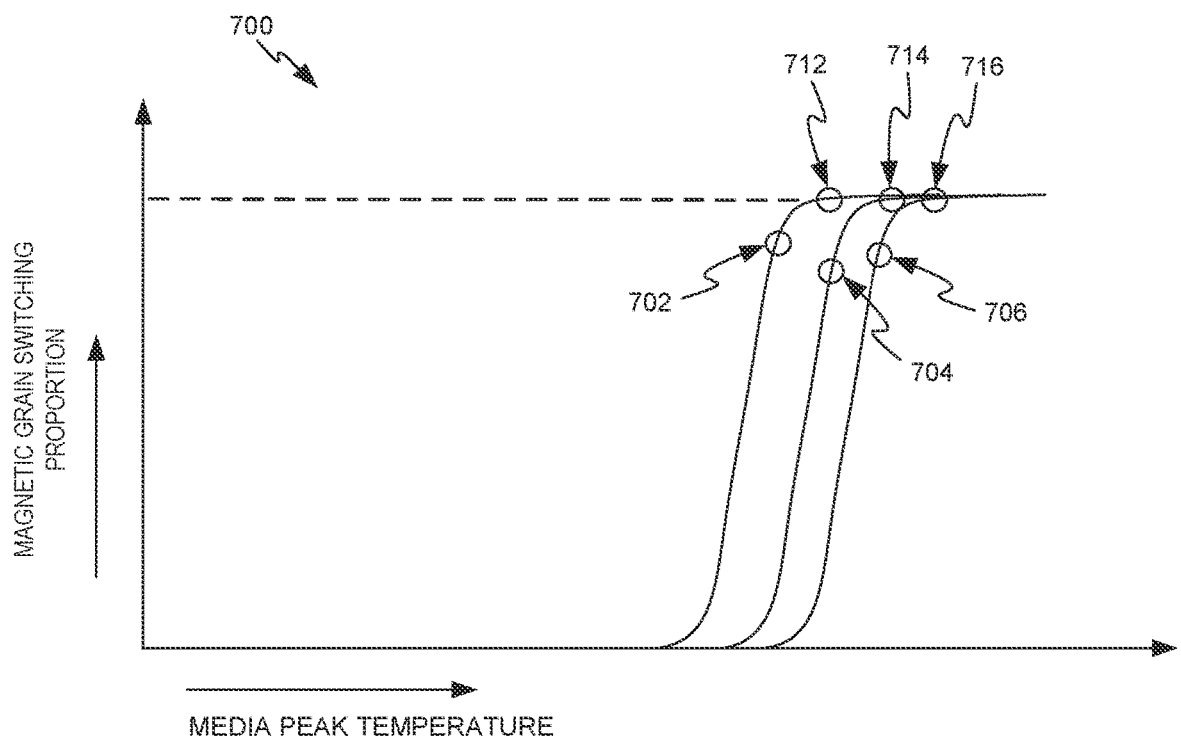
FIG. 7 depicts a graph of determined proportions of magnetic grains in three example particular media portions of disk surface that switch or re-orient relative to peak temperature imposed on the disk surface media by a head in a heat-assisted write operation, as write laser current optimization circuitry may determine as a result of a disk surface magnetic responsiveness mapping process, in accordance with aspects of the present disclosure.

FIG. 7 depicts a graph 700 of determined proportions of magnetic grains in three example particular media portions of disk surface that switch or re-orient relative to peak temperature imposed on the disk surface media by head 318 in a heat-assisted write operation, as write laser current optimization circuitry 30 may determine as a result of a disk surface magnetic responsiveness mapping process, in accordance with aspects of the present disclosure. Points 702, 704, and 706 are values of write strength and media peak temperature that may result in conventional disk drives from conventional techniques of setting the laser write current, with resulting values that are not optimized in accordance with this disclosure. Points 712, 714, and 716 are values of write strength and media peak temperature that write laser current optimization circuitry 30 achieves for each of three example disk surface media portions as a result of mapping the magnetic responsiveness of the media portions and calibrating the write laser current in response to that mapping, and calibrating the write laser current to achieve substantially complete and ideal magnetic saturation of the media portions in the heat-assisted write operations, in accordance with methods of this disclosure.

Write laser current optimization circuitry 30 may be further configured such that measuring the magnetic saturation responsiveness of corresponding disk surface 317 comprises measuring a magnetic saturation responsiveness of a selected media portion of corresponding disk surface 317 to write operations using a range of values of write laser current applied to the laser generating component, such as laser diode 320, and with the magnetic write current applied to write element 302 held constant at a nominal magnetic write element current. Write laser current optimization circuitry 30 may be further configured such that calibrating the nominal write laser current of selected head 318 comprises calibrating the nominal write laser current of selected head 318 for the selected media portion of corresponding disk surface 317 based on the measured magnetic saturation responsiveness of the selected media portion.

Write laser current optimization circuitry 30 may be further configured such that calibrating the nominal write laser current of the selected head for the corresponding disk surface based on the measured magnetic saturation responsiveness of the corresponding disk surface comprises determining a distribution of magnetic saturation levels of the media portion in response to the heat-assisted write operations using the range of values of write laser current. The distribution of magnetic saturation levels of the media portion is characterized by a reference write laser current for the media portion at which the heat-assisted write operations impose a reference degree of magnetic saturation of the media portion, and a dispersion metric, such as sigma, of the write laser current for the media portion that imposes an additional measure of magnetic saturation of the media portion. Write laser current optimization circuitry 30 may be further configured such that calibrating the nominal write laser current of the selected head for the corresponding disk surface based on the measured magnetic saturation responsiveness of the corresponding disk surface comprises selecting a nominal write laser current for the media portion, such that the nominal write laser current for the media portion is equal to the reference write laser current for the media portion plus a selected multiplier factor times the dispersion metric of the write laser current for the media portion.

Write laser current optimization circuitry 30 may be further configured such that determining the distribution of magnetic saturation levels of the media portion in response to the heat-assisted write operations comprises determining a normal distribution of the magnetic saturation levels of the media portion. Write laser current optimization circuitry 30 may be further configured such that the reference degree of magnetic saturation of the media portion comprises a mean average half magnetic saturation of the media portion. Write laser current optimization circuitry 30 may be further configured such that the dispersion metric of the write laser current for the media portion comprises a standard deviation of the write laser current for the media portion that imposes an additional standard deviation of magnetic saturation of the media portion. Write laser current optimization circuitry 30 may be further configured such that the nominal write laser current for the media portion is equal to the reference write laser current for the media portion plus the selected multiplier factor times the standard deviation of the write laser current for the media portion. Write laser current optimization circuitry 30 may be further configured to use a selected value in a range of 2.8 to 4.0 as the selected multiplier factor, such that the nominal write laser current for the media portion is equal to the reference write laser current for the media portion plus the selected value in the range of 2.8 to 4.0 times the dispersion metric of the write laser current for the media portion.

The media portion may comprise a first media portion of the corresponding disk surface. Write laser current optimization circuitry 30 may be further configured to determine normal distributions of magnetic saturation levels of each of one or more additional respective media portions of the corresponding disk surface in response to the heat-assisted write operations using the range of values of write laser current. Each of the respective normal distributions of magnetic saturation levels of each respective media portion of the one or more additional respective media portions is characterized by a respective reference write laser current for the respective media portion at which the heat-assisted write operations impose a mean average half magnetic saturation of the respective media portion, and a standard deviation of the write laser current for the respective media portion that imposes an additional standard deviation of magnetic saturation of the respective media portion Write laser current optimization circuitry 30 may be further configured to select a respective nominal write laser current for each of one or more additional respective media portions, such that each respective nominal write laser current for each respective media portion is equal to the respective reference write laser current for the respective media portion plus a respective selected multiplier factor times the respective standard deviation of the write laser current for the respective media portion.

Write laser current optimization circuitry 30 may continue to recalibrate the write laser current in the field. Write laser current optimization circuitry 30 may be further configured to repeat the measuring of the magnetic saturation responsiveness of the media portion to heat-assisted write operations using a range of values of write laser current applied to the laser generating component, and repeat the calibrating of the nominal write laser current of the selected head for the media portion based on the repeated measuring of the magnetic saturation responsiveness of the media portion. Write laser current optimization circuitry 30 may be further configured to select the multiplier factor based on achieving a target value for one or more performance metrics selected from one or more of: a target magnetic saturation proportion, a target write strength signal-to-noise ratio (SNR), and a target maximum squeeze error rate.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks, wherein the selected head comprises a magnetic write element and a laser generating component; and
   one or more processing devices, configured individually or in combination to:
   measure a responsiveness to a magnetic saturation of the corresponding disk surface to heat-assisted write operations using a range of values of write laser current applied to the laser generating component; and calibrate a nominal write laser current of the selected head for the corresponding disk surface based on the measured responsiveness to the magnetic saturation of the corresponding disk surface.

2. The data storage device of claim 1, wherein the one or more processing devices individually or in combination are further configured such that measuring the magnetic saturation responsiveness of the corresponding disk surface comprises measuring a responsiveness to a magnetic saturation of a media portion of the corresponding disk surface to write operations using a range of values of write laser current applied to the laser generating component, and wherein calibrating the nominal write laser current of the selected head comprises calibrating the nominal write laser current of the selected head for the media portion of the corresponding disk surface based on the measured responsiveness to the magnetic saturation of the media portion.

3. The data storage device of claim 2, wherein the one or more processing devices individually or in combination are further configured such that calibrating the nominal write laser current of the selected head for the corresponding disk surface based on the measured magnetic saturation responsiveness of the corresponding disk surface comprises:

determining a distribution of magnetic saturation levels of the media portion in response to the heat-assisted write operations using the range of values of write laser current, wherein the distribution of magnetic saturation levels of the media portion is characterized by a reference write laser current for the media portion at which the heat-assisted write operations impose a reference degree of magnetic saturation of the media portion, and a dispersion metric of the write laser current for the media portion that imposes an additional measure of magnetic saturation of the media portion; and selecting a nominal write laser current for the media portion, such that the nominal write laser current for the media portion is equal to the reference write laser current for the media portion plus a selected multiplier factor times the dispersion metric of the write laser current for the media portion.

4. The data storage device of claim 3, wherein the one or more processing devices individually or in combination are further configured such that:

determining the distribution of magnetic saturation levels of the media portion in response to the heat-assisted write operations comprises determining a normal distribution of the magnetic saturation levels of the media portion;

the reference degree of magnetic saturation of the media portion comprises a mean average half magnetic saturation of the media portion;

the dispersion metric of the write laser current for the media portion comprises a standard deviation of the write laser current for the media portion that imposes an additional standard deviation of magnetic saturation of the media portion; and the nominal write laser current for the media portion is equal to the reference write laser current for the media portion plus the selected multiplier factor times the standard deviation of the write laser current for the media portion.

5. The data storage device of claim 4, wherein the one or more processing devices individually or in combination are further configured to use a selected value in a range of 2.8 to 4.0 as the selected multiplier factor, such that the nominal write laser current for the media portion is equal to the reference write laser current for the media portion plus the selected value in the range of 2.8 to 4.0 times the dispersion metric of the write laser current for the media portion.

6. The data storage device of claim 4, wherein the media portion comprises a first media portion of the corresponding disk surface, and wherein the one or more processing devices individually or in combination are further configured to:

determine respective normal distributions of magnetic saturation levels of each of one or more additional respective media portions of the corresponding disk surface in response to the heat-assisted write operations using the range of values of write laser current, wherein each of the respective normal distributions of magnetic saturation levels of each respective media portion of the one or more additional respective media portions is characterized by a respective reference write laser current for the respective media portion at which the heat-assisted write operations impose a mean average half magnetic saturation of the respective media portion, and a standard deviation of the write laser current for the respective media portion that imposes an additional standard deviation of magnetic saturation of the respective media portion; and select a respective nominal write laser current for each of the one or more additional respective media portions, such that each respective nominal write laser current for each respective media portion is equal to the respective reference write laser current for the respective media portion plus a respective selected multiplier factor times the respective standard deviation of the write laser current for the respective media portion.

7. The data storage device of claim 6, wherein the one or more processing devices individually or in combination are further configured to:

store a map of the respective nominal write laser currents for the respective media portions of the corresponding disk surface in a data store; and access the map of the respective nominal write laser currents for the respective media portions in association with performing write operations to one or more of the respective media portions.

8. The data storage device of claim 3, wherein the one or more processing devices individually or in combination are further configured to:

repeat the measuring of the responsiveness to the magnetic saturation of the media portion to heat-assisted write operations using a range of values of write laser current applied to the laser generating component; and repeat the calibrating of the nominal write laser current of the selected head for the media portion based on the repeated measuring of the responsiveness to the magnetic saturation of the media portion.

9. The data storage device of claim 3, wherein the one or more processing devices individually or in combination are further configured to select the multiplier factor based on achieving a target value for one or more performance metrics selected from one or more of: a target magnetic saturation proportion, a target write strength signal-to-noise ratio (SNR), and a target maximum squeeze error rate.

10. A method comprising:

measuring, by one or more processing devices individually or in combination, a responsiveness to a magnetic saturation of a corresponding disk surface to heat-assisted write operations using a range of values of write laser current applied to a laser generating component; and calibrating, by the one or more processing devices individually or in combination, a nominal write laser current of a selected head for the corresponding disk surface based on the responsiveness of the measured magnetic saturation of the corresponding disk surface.

11. The method of claim 10, wherein measuring the magnetic saturation responsiveness of the corresponding disk surface comprises measuring a responsiveness to a magnetic saturation of a media portion of the corresponding disk surface to write operations using a range of values of write laser current applied to the laser generating component, and wherein calibrating the nominal write laser current of the selected head comprises calibrating the nominal write laser current of the selected head for the media portion of the corresponding disk surface based on the responsiveness of the measured magnetic saturation of the media portion.

12. The method of claim 11, wherein calibrating the nominal write laser current of the selected head for the corresponding disk surface based on the measured magnetic saturation responsiveness of the corresponding disk surface comprises:

determining a distribution of magnetic saturation levels of the media portion in response to the heat-assisted write operations using the range of values of write laser current, wherein the distribution of magnetic saturation levels of the media portion is characterized by a reference write laser current for the media portion at which the heat-assisted write operations impose a reference degree of magnetic saturation of the media portion, and a dispersion metric of the write laser current for the media portion that imposes an additional measure of magnetic saturation of the media portion; and selecting a nominal write laser current for the media portion, such that the nominal write laser current for the media portion is equal to the reference write laser current for the media portion plus a selected multiplier factor times the dispersion metric of the write laser current for the media portion.

13. The method of claim 12, wherein the one or more processing devices individually or in combination are further configured such that determining the distribution of magnetic saturation levels of the media portion in response to the heat-assisted write operations comprises:

determining a normal distribution of the magnetic saturation levels of the media portion, wherein the reference degree of magnetic saturation of the media portion comprises a mean average half magnetic saturation of the media portion, wherein the dispersion metric of the write laser current for the media portion comprises a standard deviation of the write laser current for the media portion that imposes an additional standard deviation of magnetic saturation of the media portion, and wherein the nominal write laser current for the media portion is equal to the reference write laser current for the media portion plus the selected multiplier factor times the standard deviation of the write laser current for the media portion.

14. The method of claim 13, further comprising using a selected value in a range of 2.8 to 4.0 as the selected multiplier factor, such that the nominal write laser current for the media portion is equal to the reference write laser current for the media portion plus the selected value in the range of 2.8 to 4.0 times the dispersion metric of the write laser current for the media portion.

15. The method of claim 13, wherein the media portion comprises a first media portion of the corresponding disk surface, the method further comprising:

determining normal distributions of magnetic saturation levels of each of one or more additional respective media portions of the corresponding disk surface in response to the heat-assisted write operations using the range of values of write laser current, wherein each of the respective normal distributions of magnetic saturation levels of each respective media portion of the one or more additional respective media portions is characterized by a respective reference write laser current for the respective media portion at which the heat-assisted write operations impose a mean average half magnetic saturation of the respective media portion, and a standard deviation of the write laser current for the respective media portion that imposes an additional standard deviation of magnetic saturation of the respective media portion; and selecting a respective nominal write laser current for each of one or more additional respective media portions, such that each respective nominal write laser current for each respective media portion is equal to the respective reference write laser current for the respective media portion plus a respective selected multiplier factor times the respective standard deviation of the write laser current for the respective media portion.

16. The method of claim 15, further comprising:

storing a map of the respective nominal write laser currents for the respective media portions of the corresponding disk surface in a data store; and accessing the map of the respective nominal write laser currents for the respective media portions in association with performing write operations to one or more of the respective media portions.

17. The method of claim 11, further comprising:

repeating the measuring of the responsiveness of the magnetic saturation of the media portion to heat-assisted write operations using a range of values of write laser current applied to the laser generating component; and repeating the calibrating of the nominal write laser current of the selected head for the media portion based on the repeated measuring of the responsiveness of the magnetic saturation of the media portion.

18. The method of claim 11, further comprising selecting the multiplier factor based on achieving a target value for one or more performance metrics selected from one or more of: a target magnetic saturation proportion, a target write strength signal-to-noise ratio (SNR), and a target maximum squeeze error rate.

19. One or more processing devices individually or in combination comprising:

means for measuring a responsiveness to a magnetic saturation of a corresponding disk surface to heat-assisted write operations using a range of values of write laser current applied to a laser generating component; and means for calibrating a nominal write laser current of a selected head for the corresponding disk surface based on the measured responsiveness to the magnetic saturation of the corresponding disk surface.

20. The one or more processing devices of claim 19, wherein measuring the magnetic saturation responsiveness of the corresponding disk surface comprises measuring a responsiveness of a magnetic saturation of a media portion of the corresponding disk surface to write operations using a range of values of write laser current applied to the laser generating component, and wherein calibrating the nominal write laser current of the selected head comprises calibrating the nominal write laser current of the selected head for the media portion of the corresponding disk surface based on the measured magnetic saturation responsiveness of the media portion.

* * * * *